(12) United States Patent
Chang

(10) Patent No.: US 9,557,000 B2
(45) Date of Patent: Jan. 31, 2017

(54) MOVEMENT AUXILIARY DEVICE FOR MACHINE STAND

(71) Applicant: KINGSAND MACHINERY LTD., Taichung (TW)

(72) Inventor: Chin-Feng Chang, Taichung (TW)

(73) Assignee: KINGSAND MACHINERY LTD., Taichung (TW)

( * ) Notice: Subject to any disclaimer, the term of this patent is extended or adjusted under 35 U.S.C. 154(b) by 0 days.

(21) Appl. No.: 14/712,893

(22) Filed: May 14, 2015

(65) Prior Publication Data

US 2016/0334051 A1    Nov. 17, 2016

(51) Int. Cl.
*F16M 13/00* (2006.01)
*F16M 11/42* (2006.01)

(52) U.S. Cl.
CPC .............. *F16M 11/42* (2013.01); *F16M 13/00* (2013.01)

(58) Field of Classification Search
CPC .......... F16M 11/42; F16M 3/00; F16M 14/20; B23Q 9/0014; B60B 33/06; B25H 1/04; B25H 1/00; A61G 7/0015
USPC ............... 248/647, 649, 646, 677, 678, 128, 129, 248/130, 127; 280/6.15, 35, 43.12, 43.13, 280/43.14, 43.17, 43.24, 6.151, 6.153, 6.154, 280/6.155, 638
See application file for complete search history.

(56) References Cited

U.S. PATENT DOCUMENTS

| | | | | |
|---|---|---|---|---|
| 2,843,392 A * | 7/1958 | Simpkins | ................ | B60B 33/06 280/43.14 |
| 4,157,798 A * | 6/1979 | Lin | .......................... | B25H 1/04 108/115 |
| 7,584,935 B2 * | 9/2009 | Chen | ........................ | B25H 1/04 248/647 |
| 8,511,693 B2 * | 8/2013 | Gass | ........................ | B25H 1/04 280/43.14 |
| 8,657,306 B2 * | 2/2014 | Chiu | ....................... | B23Q 1/015 280/43.1 |
| 9,290,050 B2 * | 3/2016 | Chang | ....................... | B27B 5/10 |
| 2006/0045685 A1 * | 3/2006 | Warner | ................ | B25H 1/0014 414/458 |
| 2008/0056871 A1 * | 3/2008 | Morgan | ................ | B62B 3/0643 414/495 |
| 2010/0303593 A1 * | 12/2010 | Peacock | .................. | B62B 5/049 414/458 |
| 2013/0056610 A1 * | 3/2013 | Gass | ........................ | B25H 1/04 248/647 |

* cited by examiner

*Primary Examiner* — Nkeisha Smith
(74) *Attorney, Agent, or Firm* — Raymond Y. Chan; David and Raymond Patent Firm

(57) ABSTRACT

A movement auxiliary device for a machine stand includes a foot stand. Two sides of the lower end of the foot stand are provided with first and second side seats having vertical rail grooves, respectively. A movable lever, a pivot seat and a lifting roller assembly are provided between the two rail grooves. The foot stand is provided with a support seat. A connecting board having a pedal is pivotally connected between the support seat and the pivot seat, which can be pivoted on the pivot seat. The movable lever is pivotally connected with a pneumatic cylinder to provide a buffering function for the lifting roller assembly and the machine stand. The pedal is controlled for the connecting board and the pivot seat to generate a link pivot, such that the lifting roller assembly is descended to the ground or ascended upward.

7 Claims, 7 Drawing Sheets

MOVEMENT AUXILIARY DEVICE FOR MACHINE STAND

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a movement auxiliary device for a machine stand, and more particularly to a movement auxiliary device provided with a foot stand. The foot stand can be propped up by means of a stamping control way, such that the machine stand can be moved conveniently.

Description of Related Arts

As shown in FIG. 1, a conventional processing machine, such as a wood working lathe and a wood planing machine, is provided with a pair of symmetrical foot stands 11 under the machine stand 10. The bottoms of the foot stands 11 are provided with foot pads 12 to form four supports for maintaining the height and weight of the machine stand 10. However, due to work habits, gestures, material sizes or temporary conditions, a movement is required within a certain range. The machine stand 10 with the immovable foot stand 11 must be displaced manually. Sometime, it is necessary to use a special apparatus. The process of movement is very time-consuming and laborious. For many users, this causes a great trouble. Furthermore, during movement, the foot pads 12 rub against the ground, causing scratches on the ground and damage to the foot pads 12. This is inconvenient for use and needs improvement.

In view of this, it is necessary to make the machine stand 10 labor-saving and convenient for displacement. Accordingly, the inventor of the present invention has devoted himself based on his many years of practical experiences to solve these problems.

SUMMARY OF THE PRESENT INVENTION

The primary object of the present invention is to provide a movement auxiliary device for a machine stand to solve the foregoing problems.

In order to achieve the aforesaid object, the movement auxiliary device of the present invention comprises a foot stand. Two sides of the foot stand are provided with first and second side seats. The two side seats have rail grooves respectively. A lifting roller assembly is coupled between the two rail grooves. The pedal controls the lifting roller assembly to slide vertically within the rail grooves. When the lifting roller assembly is descended, the rollers can prop up the foot stand. When the lifting roller assembly is ascended, the foot stand is returned to provide a support effect. The present invention is labor-saving and can be used conveniently.

Preferably, a pneumatic cylinder is provided between the movable lever of the lifting roller assembly and the foot stand. This is beneficial for the foot stand to return to the ground and to buffer the speed of dropping of the machine stand. The present invention is safe for use.

DETAILED DESCRIPTION OF THE PREFERRED EMBODIMENT

Figure 1:
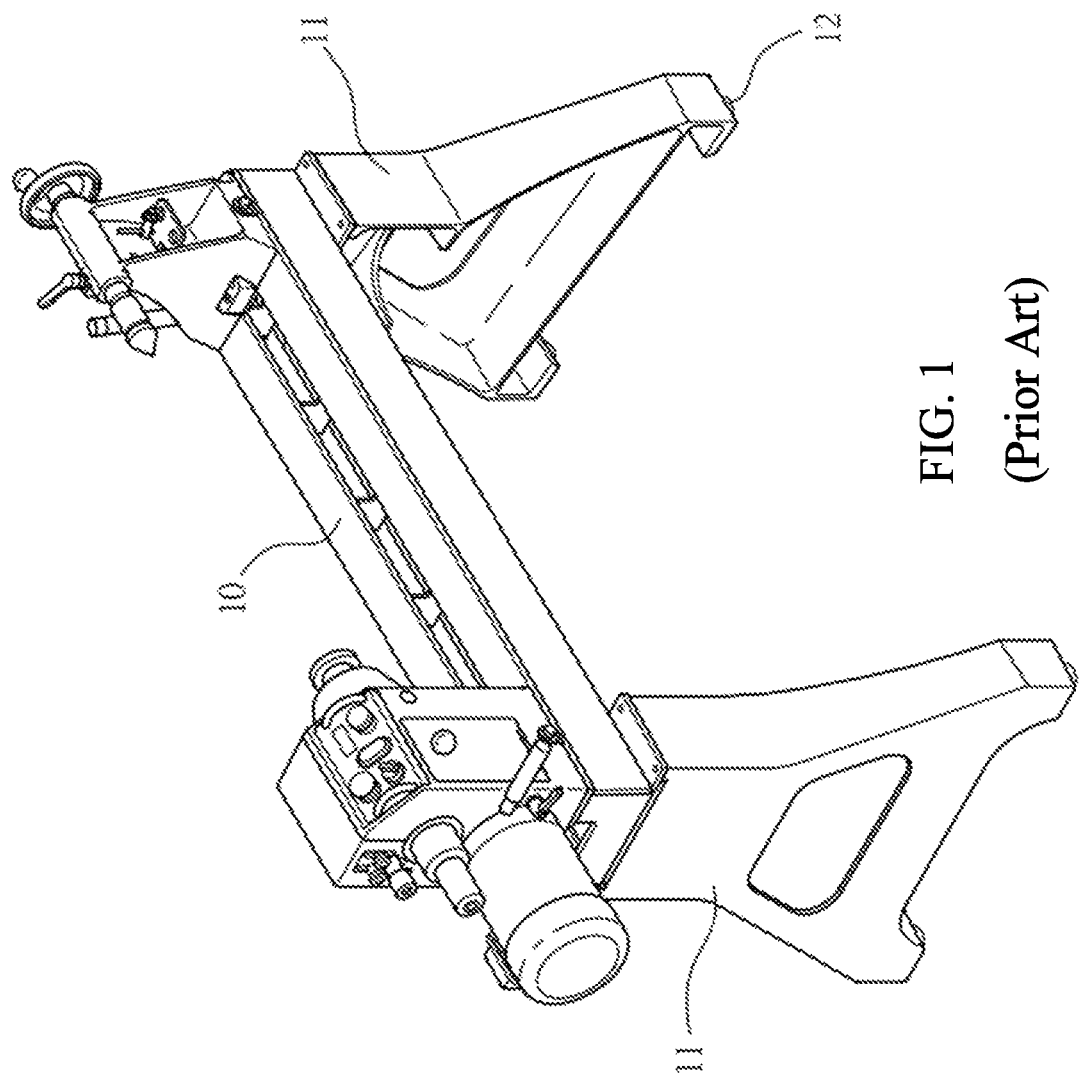
FIG. 1 is a perspective view of a conventional foot stand.
Figure 2:
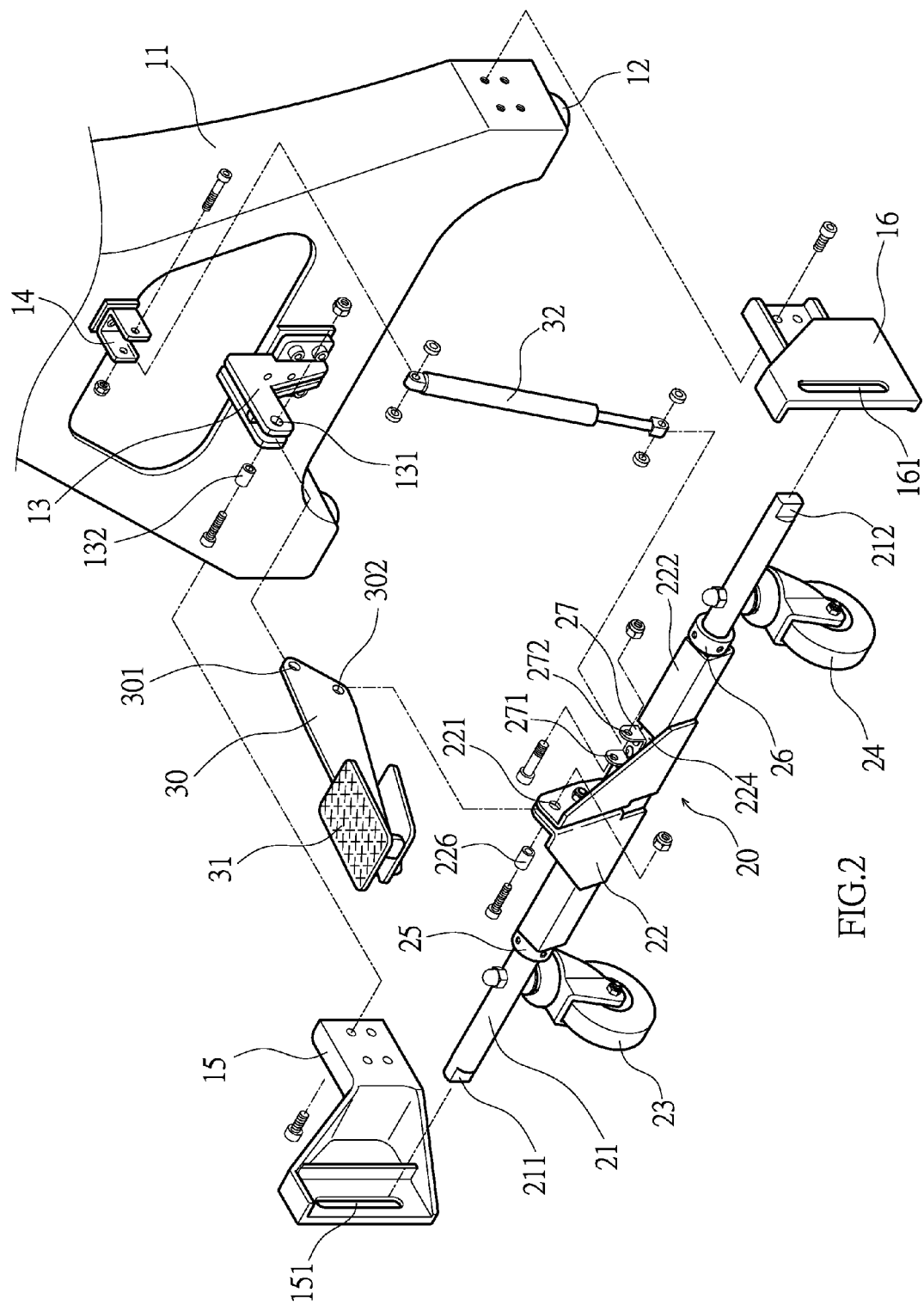
FIG. 2 is an exploded view of the present invention.
Figure 3:
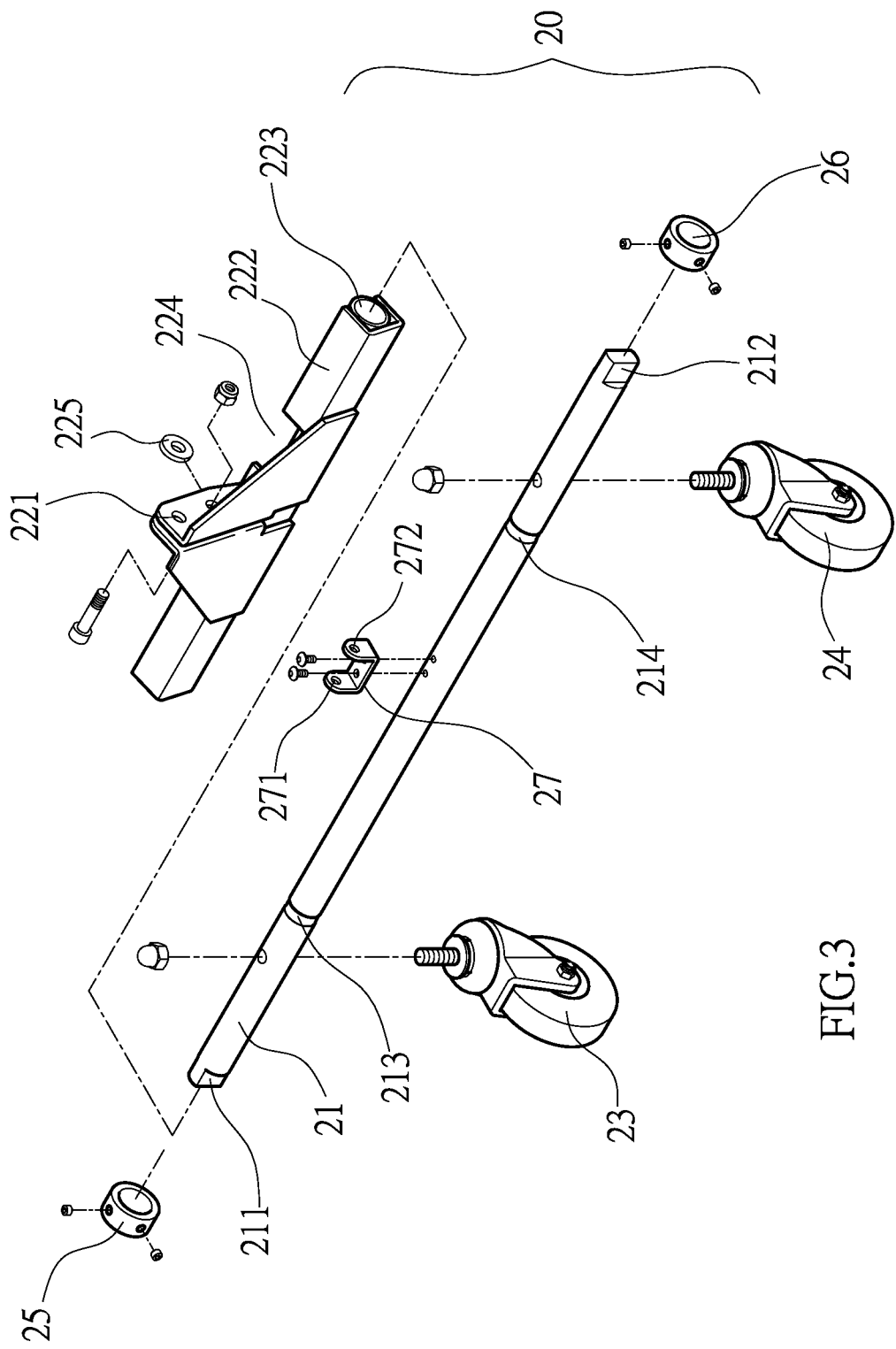
FIG. 3 is an exploded view of the lifting roller assembly of the present invention.
Figure 4:
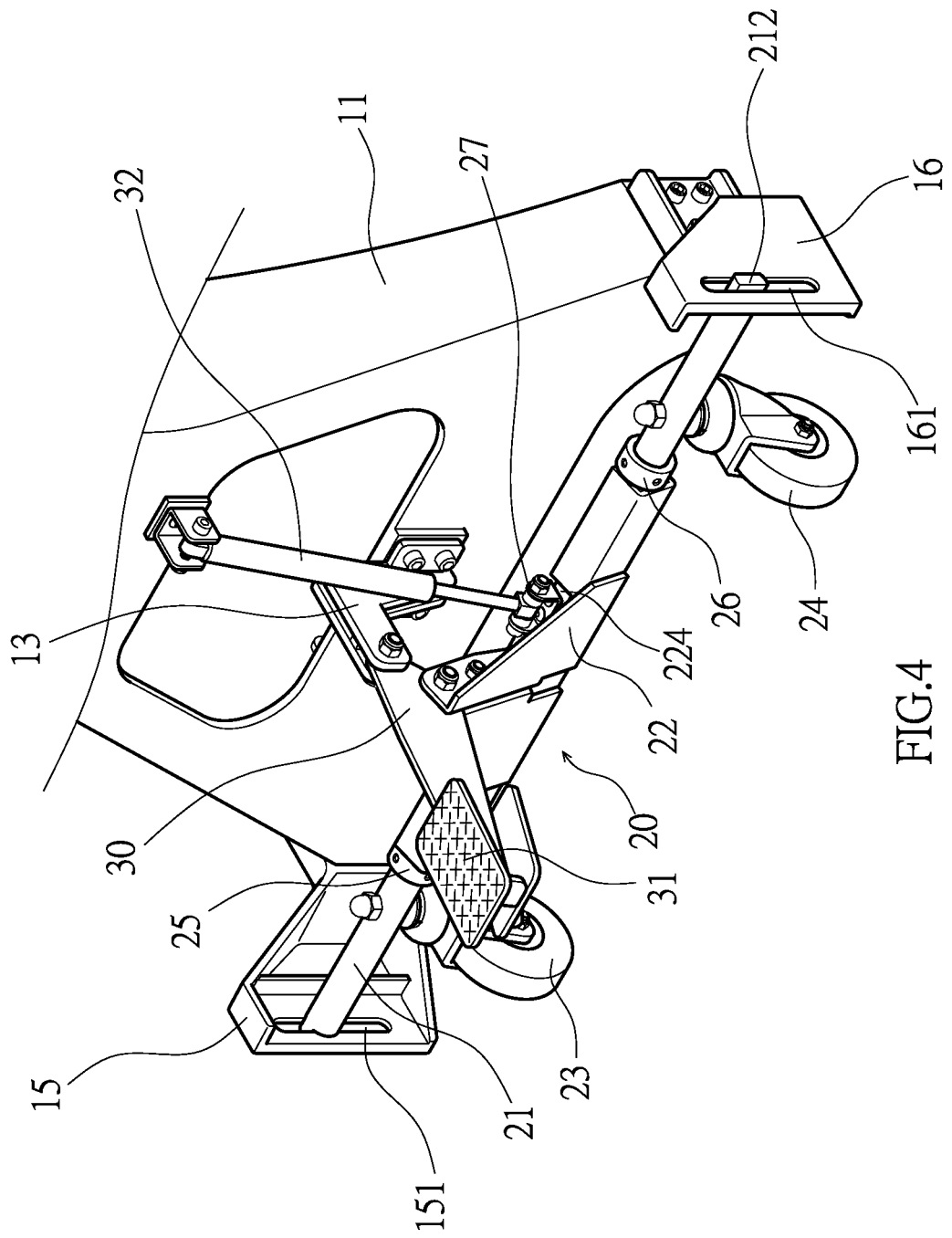
FIG. 4 is an assembled perspective view of the present invention.
Figure 5:
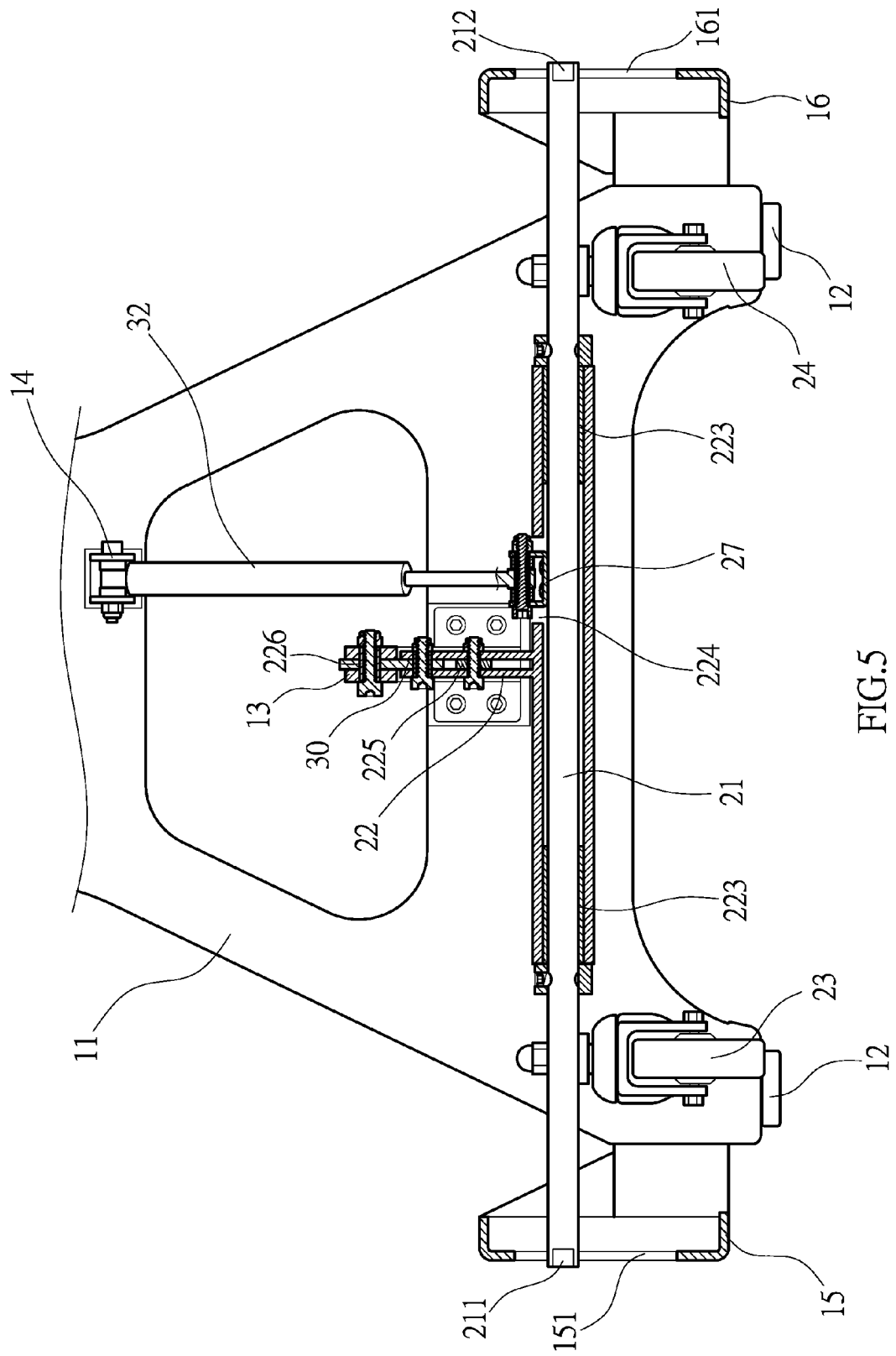
FIG. 5 is a front sectional view of the present invention.

Embodiments of the present invention will now be described, by way of example only, with reference to the accompanying drawings.

As shown in FIG. 2 through FIG. 6, the present invention discloses a movement auxiliary device for a machine stand. The movement auxiliary device comprises a foot stand 11. Two sides of the lower end of the foot stand 11 are provided with first and second side seats 15, 16 having vertical rail grooves 151, 161, respectively. A lifting roller assembly 20 is provided between the two rail grooves 151, 161. The lifting roller assembly 20 comprises a transverse movable lever 21 having rollers 23, 24. Two ends of the movable lever 21 have limit portions 211, 212 and are inserted into the rail grooves 151, 161. The moveable lever 21 is pivotally connected with a pivot seat 22 having a pivot hole 221. The moveable lever 21 is provided with a connecting seat 27 having through holes 271, 272. The foot stand 11 comprises a support seat 13 and a fixing seat 14 thereon. The support seat 13 has a shaft hole 131. A connecting board 30 having a pedal 31 is provided between the support seat 13 and the pivot seat 22. An upper end of the connecting board 30 is provided with an upper coupling hole 301, and a lower end of the connecting board 30 is provided with a lower coupling hole 302. The upper coupling hole 301 is pivotally connected with the shaft hole 131 of the support seat 13 through a bolt. The lower coupling hole 302 is pivotally connected with the pivot hole 221 of the pivot seat 22 through a bolt. The pivot seat 22 is composed of a pair of symmetrical boards and a bushing 225 is sandwiched in between the two boards for the pivot seat 22 and the connecting board 30 to be pivoted. A pneumatic cylinder 32 is provided between the fixing seat 14 and the moveable lever 21. One end of the pneumatic cylinder 32 is pivotally connected with the fixing seat 14, and another end of the pneumatic cylinder 32 is pivotally connected with the through holes 271, 272 of the pivot seat 27 in cooperation with a screw and a nut.

By the aforesaid device, the pedal 31 is controlled for the connecting board 30 and the pivot seat 22 to generate a link pivot to link the moveable lever 21, such that the rollers 23, 24 can be descended to the ground or ascended upward. The present invention is labor-saving and provides a buffering effect and can be moved conveniently.

The assembly of the present invention is detailed hereinafter. Referring to FIG. 2 through FIG. 6, the present invention uses a link mechanism and is designed on the lever principle. The support seat 13 is composed of two boards to clamp the connecting board 30. A reinforcement sleeve 132 is inserted in the shaft hole 131 and the upper coupling hole 301 to form an immovable turning shaft. The pivot seat 22 is to clamp the connecting board 30. A reinforcement sleeve 226 is inserted in the pivot hole 221 and the lower coupling hole 302 to form a free turning shaft. A lower end of the pivot seat 22 is provided with a coupling portion 222 having pivotal holes 223 at two ends thereof. The movable lever 21 is inserted through the pivotal holes 223 to form a turning shaft. The coupling portion 22 has a notch 224 for the pivot seat 22 not to touch the connecting seat 27 when the pivot seat 22 is turned. The movable lever 21 is provided with positioning members 25, 26 located at two ends of the coupling portion 222. The outer wall of the movable lever 21 is provided with positioning grooves 213, 214 for the positioning members 25, 26 to be secured on the positioning grooves 213, 214 in cooperation with screws so as to limit the horizontal displacement of the pivot seat 22. When the connecting board 30 is applied with a force, the upper coupling hole 301 acts as a pivot for turning, and the lower coupling hole 302 brings the pivot seat 22 to deflect an angle with the movable lever 21 as the axle so that the distance between the shaft hole 131 of the support seat 13 and the movable lever 21 is changed. Two sides of the limit portions 211, 212 are flat, such that the limit portions 211, 212 cannot be turned when inserted in the rail grooves 151, 161. The movable lever 21 is vertically moved up and down and won't be deflected for the lifting roller assembly 20 to descend to the ground or ascend away from the ground. The distance from the upper coupling hole 301 to the outer edge of the pedal 31 is defined as an effort arm. The distance from the upper coupling hole 301 to the lower coupling hole 302 is defined as a resistance arm. The effort arm is greater than the resistance arm, so that the pedal 31 is controlled to prop up the machine stand 10 easily to save labor.

Figure 6:
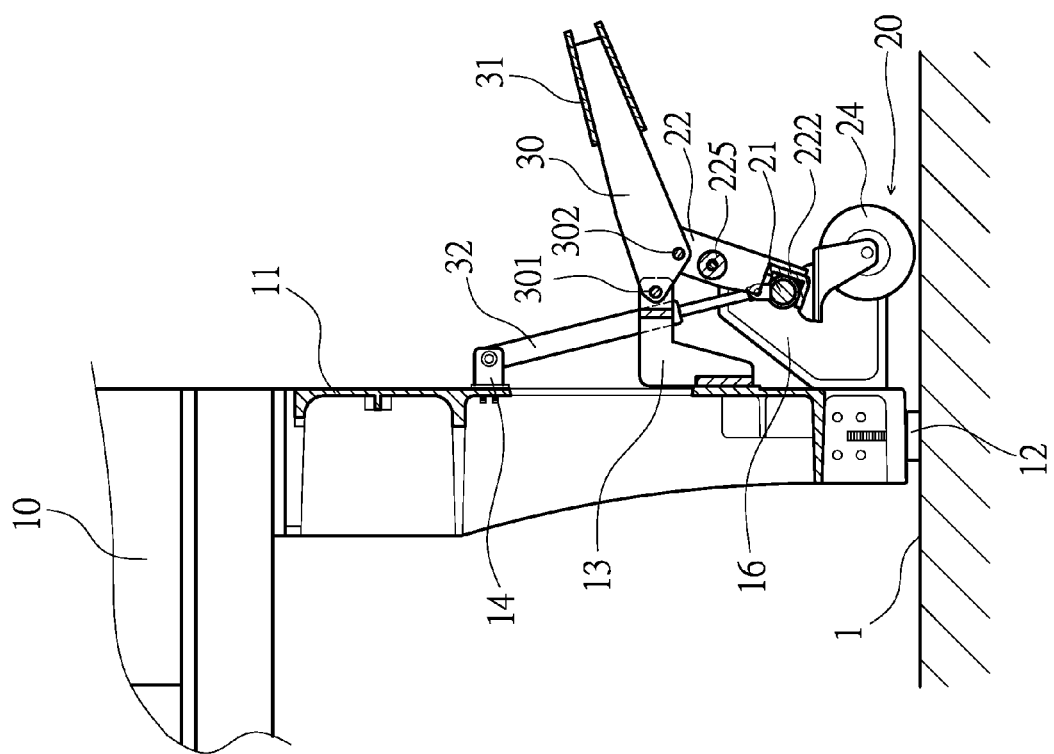
FIG. 6 is a side sectional view of the present invention when the pedal is not stamped.
Figure 7:
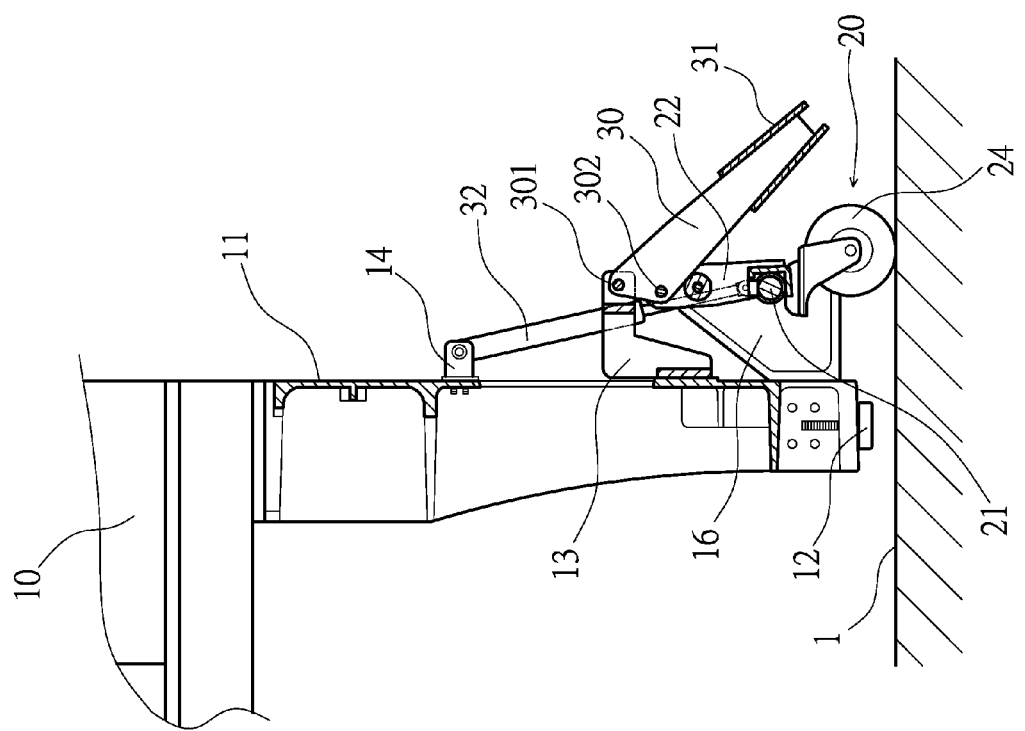
FIG. 7 is a side sectional view of the present invention when the pedal is stamped downward.

Referring to FIG. 6, when the pedal 31 is tilted upward, not stamped, the pivot seat 22 and the connecting board 30 are at an L-like angle. Therefore, the distance between the support seat 13 and the movable lever 21 is shorter, such that the roller 24 of the lifting roller assembly 20 is ascended and the foot stand 11 is in contact with the ground 1. Referring to FIG. 7, when the pedal 31 is pressed downward, the ends of the pivot seat 22 and the connecting board 30 are like a straight line. Therefore, the distance between the support seat 13 and the movable lever 21 is longer, such that the roller 24 of the lifting roller assembly 20 is subjected to the rail grooves to move vertically and downward so as to prop up the foot stand 11 away from the ground 1. The roller 24 bears the weight of the machine stand 10, and its reacting force restores the pedal 31, not in a stamped state. In order to prevent this situation from occurring, when the ends of the pivot seat 22 and the connecting board 30 are like a straight line, the pedal 31 is stamped downward continuously for the lower coupling hole 302 to pivot continuously beyond the lower dead point to be curved slightly. The bottom edge of the connecting board 30 leans against the bushing 225, such that the pedal 31 is jammed and won't be turned continuously. When the reacting force is applied to the roller 24, the pivot seat 22 and the connecting board 30 are pivoted continuously in the turning direction. Subject to the bushing 225, the pedal 31 won't be pivoted continuously any more to be a motionless state. The present invention achieves the practical effects of saving labor and convenient movement.

When the user wants to restore the foot stand 11 to the ground, the pedal 31 is pulled to tilt upward. The heavy machine stand 10 may drop instantaneously to damage the surface of the floor or hurt people. The pedal 31 may be rebounded quickly to hurt the user. Therefore, the pneumatic cylinder 32 is set in a full pressure and support state. When the lower coupling hole 302 is pulled back exceed the lower dead point and the machine stand 10 loses support instantaneously, the pneumatic cylinder 32 is adapted to buffer the speed of dropping for the foot stand 11 to descend slowly and the pedal 31 is returned slowly. The present invention provides a better buffering effect and is safe for use.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A movement auxiliary device for a machine stand, comprising a foot stand, two sides of a lower end of the foot stand being provided with first and second side seats having vertical rail grooves respectively, a lifting roller assembly being provided between the two rail grooves, the lifting roller assembly comprising a transverse movable lever having two rollers, two ends of the movable lever having limit portions and being inserted into the rail grooves, the moveable lever being pivotally connected with a pivot seat having a pivot hole; the foot stand comprising a support seat thereon, the support seat having a shaft hole, a connecting board having a pedal being provided between the support seat and the lifting roller assembly, an upper end of the connecting board being provided with an upper coupling hole, a lower end of the connecting board being provided with a lower coupling hole, the upper coupling hole being pivotally connected with the shaft hole of the support seat and the lower coupling hole being pivotally connected with the pivot hole of the pivot seat so that the connecting board can be pivoted on the pivot seat, wherein a distance from the upper coupling hole to an outer edge of the pedal is greater than another distance from the upper coupling hole to the lower coupling hole;

thereby, the pedal controlling the connecting board to pivot for the lifting roller assembly to vertically descend downward or to ascend upward.

2. A movement auxiliary device for a machine stand, comprising a foot stand, two sides of a lower end of the foot stand being provided with first and second side seats having vertical rail grooves respectively, a lifting roller assembly being provided between the two rail grooves, the lifting roller assembly comprising a transverse movable lever having two rollers, two ends of the movable lever having limit portions and being inserted into the rail grooves, the moveable lever being pivotally connected with a pivot seat having a pivot hole; the foot stand comprising a support seat thereon, the support seat having a shaft hole, a connecting board having a pedal being provided between the support seat and the lifting roller assembly, an upper end of the connecting board being provided with an upper coupling hole, a lower end of the connecting board being provided with a lower coupling hole, the upper coupling hole being pivotally connected with the shaft hole of the support seat and the lower coupling hole being pivotally connected with the pivot hole of the pivot seat so that the connecting board can be pivoted on the pivot seat, wherein a lower end of the pivot seat is provided with a coupling portion having pivotal holes at two ends thereof and pivotally coupled to the movable lever;

thereby, the pedal controlling the connecting board to pivot for the lifting roller assembly to vertically descend downward or to ascend upward.

3. The movement auxiliary device as claimed in claim 2, wherein the coupling portion has a notch.

4. The movement auxiliary device as claimed in claim 2, wherein the movable lever is provided with positioning members located at two ends of the coupling portion, and an outer wall of the movable lever is provided with positioning grooves for the positioning members to be secured on the positioning grooves in cooperation with screws.

5. A movement auxiliary device for a machine stand, comprising a foot stand, two sides of a lower end of the foot stand being provided with first and second side seats having vertical rail grooves respectively, a lifting roller assembly being provided between the two rail grooves, the lifting roller assembly comprising a transverse movable lever having two rollers, two ends of the movable lever having limit portions and being inserted into the rail grooves, the moveable lever being pivotally connected with a pivot seat having a pivot hole; the foot stand comprising a support seat thereon, the support seat having a shaft hole, a connecting board having a pedal being provided between the support seat and the lifting roller assembly, an upper end of the connecting board being provided with an upper coupling hole, a lower end of the connecting board being provided with a lower coupling hole, the upper coupling hole being pivotally connected with the shaft hole of the support seat and the lower coupling hole being pivotally connected with the pivot hole of the pivot seat so that the connecting board can be pivoted on the pivot seat, wherein two sides of each of the limit portions are flat, thereby, the pedal controlling the connecting board to pivot for the lifting roller assembly to vertically descend downward or to ascend upward.

6. A movement auxiliary device for a machine stand, comprising a foot stand, two sides of a lower end of the foot stand being provided with first and second side seats having vertical rail grooves respectively, a lifting roller assembly being provided between the two rail grooves, the lifting roller assembly comprising a transverse movable lever having two rollers, two ends of the movable lever having limit portions and being inserted into the rail grooves, the moveable lever being pivotally connected with a pivot seat having a pivot hole; the foot stand comprising a support seat thereon, the support seat having a shaft hole, a connecting board having a pedal being provided between the support seat and the lifting roller assembly, an upper end of the connecting board being provided with an upper coupling hole, a lower end of the connecting board being provided with a lower coupling hole, the upper coupling hole being pivotally connected with the shaft hole of the support seat and the lower coupling hole being pivotally connected with the pivot hole of the pivot seat so that the connecting board can be pivoted on the pivot seat, wherein the moveable lever is provided with a connecting seat, the foot stand comprises a fixing seat thereon, and a pneumatic cylinder is provided between the connecting seat and the fixing seat;

thereby, the pedal controlling the connecting board to pivot for the lifting roller assembly to vertically descend downward or to ascend upward.

7. A movement auxiliary device for a machine stand, comprising a foot stand, two sides of a lower end of the foot stand being provided with first and second side seats having vertical rail grooves respectively, a lifting roller assembly being provided between the two rail grooves, the lifting roller assembly comprising a transverse movable lever having two rollers, two ends of the movable lever having limit portions and being inserted into the rail grooves, the moveable lever being pivotally connected with a pivot seat having a pivot hole; the foot stand comprising a support seat thereon, the support seat having a shaft hole, a connecting board having a pedal being provided between the support seat and the lifting roller assembly, an upper end of the connecting board being provided with an upper coupling hole, a lower end of the connecting board being provided with a lower coupling hole, the upper coupling hole being pivotally connected with the shaft hole of the support seat and the lower coupling hole being pivotally connected with the pivot hole of the pivot seat so that the connecting board can be pivoted on the pivot seat, wherein the pivot seat is composed of a pair of symmetrical boards, and a bushing is sandwiched in between the two boards for a bottom edge of the connecting board to lean against the pivot seat;

thereby, the pedal controlling the connecting board to pivot for the lifting roller assembly to vertically descend downward or to ascend upward.

* * * * *